US012633104B2

(12) United States Patent (10) Patent No.: US 12,633,104 B2
Wang et al. (45) Date of Patent: May 19, 2026

(54) IMAGE FEATURE TRANSMISSION METHOD, DEVICE AND SYSTEM

(71) Applicant: CHINA TELECOM CORPORATION LIMITED, Beijing (CN)

(72) Inventors: Huifen Wang, Beijing (CN); Yuan Zhang, Beijing (CN); Mingchuan Yang, Beijing (CN); Zheng He, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 301 days.

(21) Appl. No.: 18/284,494

(22) PCT Filed: Nov. 1, 2021

(86) PCT No.: PCT/CN2021/127900
§ 371 (c)(1),
(2) Date: Sep. 27, 2023

(87) PCT Pub. No.: WO2022/205890
PCT Pub. Date: Oct. 6, 2022

(65) Prior Publication Data
US 2024/0169713 A1 May 23, 2024

(30) Foreign Application Priority Data

Mar. 30, 2021 (CN) .......................... 202110339533.2

(51) Int. Cl.
*G06V 10/82* (2022.01)
*G06T 9/00* (2006.01)
(52) U.S. Cl.
CPC .............. *G06V 10/82* (2022.01); *G06T 9/002* (2013.01)

(58) Field of Classification Search
CPC ...... G06V 10/82; G06V 10/467; G06T 9/002; G06T 9/00; G06N 3/0464; G06N 3/08
See application file for complete search history.

(56) References Cited

U.S. PATENT DOCUMENTS 11,153,566 B1 10/2021 Tao et al.
2017/0076754 A1 3/2017 Pello
(Continued)

FOREIGN PATENT DOCUMENTS

CN 107507153 12/2017
CN 109948700 A 6/2019
(Continued)

OTHER PUBLICATIONS

CN111787323 Tao et al., machine translated (Year: 2020).*
(Continued)

*Primary Examiner* — Jianxun Yang
(74) *Attorney, Agent, or Firm* — Andrew M. Calderon; Calderon Safran & Wright P.C.

(57) ABSTRACT
The invention relates to an image feature transmission method, device and system, and relates to the technical field of communication. The transmission method includes the following steps: extracting a feature matrix of a to-be-processed image for each channel by using a machine learning model; determining one or more incidence matrix pairs according to a comparison result of the correlation degree between the feature matrixes and a first threshold value; according to the information amount, determining a representation matrix and a represented matrix in the two feature matrixes of each incidence matrix pair; determining a corresponding relation between each representation matrix and each represented matrix; and carrying out quantization processing and coding processing on each representation matrix, the corresponding relation and the maximum characteristic value and the minimum characteristic value in
(Continued)

each represented matrix, and then transmitting to a decoding end.

19 Claims, 4 Drawing Sheets

(56) References Cited

U.S. PATENT DOCUMENTS

| | | | |
|---|---|---|---|
| 2018/0084253 A1 | 3/2018 | Thiagarajan et al. |
| 2018/0173994 A1 | 6/2018 | Rippel et al. |
| 2020/0273192 A1 | 8/2020 | Cheng et al. |
| 2020/0372684 A1 | 11/2020 | Wen et al. |
| 2020/0374522 A1 | 11/2020 | Zhou et al. |
| 2022/0292132 A1 | 9/2022 | Guo |

FOREIGN PATENT DOCUMENTS

| | | | |
|---|---|---|---|
| CN | 110348462 A | 10/2019 |
| CN | 111444957 A | 7/2020 |
| CN | 111787323 A | 10/2020 |
| CN | 111950699 A | 11/2020 |
| JP | 2020191077 A | 11/2020 |
| JP | 2020191631 A | 11/2020 |
| WO | 2020238603 A1 | 12/2020 |
| WO | 2021012691 | 9/2022 |

OTHER PUBLICATIONS

Entropy-based Pruning, Luo et al.2017 (Year: 2017).*
Decision to Grant a Patent issued Dec. 4, 2024 in JP Application No. 2023-560607, 5 pages.
Decision to Grant a Patent issued May 30, 2024 in CN Application No. 20110339533.2, 8 pages.
International Search Report and Written Opinion issued on Jan. 20, 2022 in corresponding Application No. PCT/CN2021/127900; ISSN:1674-6864; pp. 1-7; 10 pages.
(Miao, Jun et al.), (An Image Shape Coding Expression Method and its Application), (Journal of Beijing Information Science & Technology University), vol. 35, No. 6, (Dec. 31, 2020).
(Zhang, Yuan et al.), (Machine Vision Technology, Standardization, and Application in Safety Industry), (Telecommunications Science), vol. 36, No. 11, (Nov. 30, 2020-11-30), ISSN: 1000-0801; pp. 104-112.
International Preliminary Report on Patentability and Written Opinion of the ISA issued on Jan. 20, 2022 in corresponding Application No. PCT/CN2021/127900; ISSN: 1674-6864; pp. 1-7; 10 pages.
(Zhang, Yuan et al.), (Machine Vision Technology, Standardization, and Application in Safety Industry), (Telecommunications Science), vol. 36, No. 11, (Nov. 30, 2020), ISSN:1000-0801; pp. 104-112.

* cited by examiner

IMAGE FEATURE TRANSMISSION METHOD, DEVICE AND SYSTEM

CROSS-REFERENCE TO RELATED APPLICATIONS

The present disclosure is a U.S. National Stage Application under 35 U.S.C. § 371 of International Patent Application No. PCT/CN2021/127900, filed on Nov. 1, 2022, which is based on and claims priority of Chinese application for invention No. 202110339533.2, filed on Mar. 30, 2021, the disclosure of which is hereby incorporated into this disclosure by reference in its entirety.

TECHNICAL FIELD

This disclosure relates to the field of communication technology, in particular to a transmission method for image features, a transmission apparatus for image features, a transmission system for image features, and a non-transitory computer readable storage medium.

BACKGROUND

With the growth of machine learning applications, many intelligent platforms have been adopted in a variety of fields, such as the Internet of Vehicles, video surveillance, and smart cities. These platforms generate massive data communication with a large number of sensors.

In related technologies, data in communication is encoded using human vision-based encoding methods.

SUMMARY

According to some embodiments of the present disclosure, there is provided a transmission method for image features, comprising: extracting a feature matrix for a channel of an image to be processed using a machine learning model; determining one or more pairs of correlated matrices based on a result of comparing a degree of correlation between feature matrices with a first threshold; determining a representative matrix and a represented matrix from two feature matrices of each of the one or more pairs of correlated matrices based on an amount of information; determining correspondence between the representative matrix and the represented matrix; transmitting the representative matrix, the correspondence, and a maximum feature value and a minimum feature value of the represented matrix quantized and encoded to a decoder.

In some embodiments, determining one or more pairs of correlated matrices based on a result of comparing a degree of correlation between feature matrices with a first threshold comprises: calculating the degree of correlation between the feature matrices based on a distribution of feature values of the feature matrices; determining two feature matrices as a pair of correlated matrices in a case where a degree of correlation between the two feature matrices is greater than a first threshold.

In some embodiments, calculating the degree of correlation between the feature matrices based on a distribution of feature values of the feature matrices comprises: calculating a probability of homogeneity of variance between the feature matrices as the degree of correlation.

In some embodiments, determining correspondence between the representative matrix and the represented matrix comprises: determining a representative matrix with largest amount of information among a plurality of representative matrices as a representative matrix corresponding to a represented matrix in a case where the represented matrix corresponds to the plurality of representative matrix.

In some embodiments, determining one or more pairs of correlated matrices based on a result of comparing a degree of correlation between feature matrices with a first threshold comprises: selecting a feature matrix as a current object from candidate feature matrices that are unselected feature matrices; calculating a degree of correlation between the current object and each of the candidate feature matrices; selecting a next feature matrix as a current object to calculate a degree of correlation until only one candidate feature matrix remains.

In some embodiments, determining one or more pairs of correlated matrices based on a result of comparing a degree of correlation between feature matrices with a first threshold comprises: normalizing feature values of each of the feature matrices; calculating the degree of correlation between normalized feature matrices.

In some embodiments, the transmission method further comprises: calculating an amount of information for the feature matrix; determining whether the amount of information of the feature matrix is less than a second threshold; determining one or more pairs of correlated matrices based on a result of comparing a degree of correlation between feature matrices with a first threshold comprises: calculating the degree of correlation between feature matrices having amounts of information that are less than the second threshold; determining the one or more pairs of correlated matrices based on a result of comparing the degree of correlation with the first threshold.

In some embodiments, transmitting the representative matrix, the correspondence, and a maximum feature value and a minimum feature value of the represented matrix quantized and encoded to a decoder to a decoder comprises: performing a quantization process on the representative matrix having the correspondence; transmitting a result of the quantization encoded, the correspondence encoded, and the maximum feature value and the minimum feature value of the represented matrix encoded to the decoder.

In some embodiments, the transmission method further comprises: performing decoding and inverse quantization (de-quantization) processing at the decoder to obtain the representative matrix having the correspondence, the correspondence, and the maximum feature value and the minimum feature value of the represented matrix.

In some embodiments, the transmission method further comprises: obtaining the represented matrix at the decoder, based on a maximum feature value and a minimum feature value of the representative matrix and the maximum feature value and the minimum feature value of the represented matrix corresponding to the representative matrix.

In some embodiments, determining correspondence between the representative matrix and the represented matrix comprises: storing each of the one or more pairs of correlated matrices as a key-value pair, using a channel sequence number of a represented matrix in the each of the pairs of correlated matrices as a key value, and a channel sequence number of the represented matrix in the each of the pairs of correlated matrices as a data value; aggregating a plurality of representative matrices corresponding to a same represented matrix to generate a representation relationship dictionary, using the key value; determining the correspondence between the representative matrix and the represented matrix, based on the representation relationship dictionary.

According to other embodiments of the present disclosure, there is provided a transmission apparatus for image features, comprising: an extraction unit for extracting a feature matrix for a channel of an image to be processed using a machine learning model; a determination unit for determining one or more pairs of correlated matrices based on a result of comparing a degree of correlation between feature matrices with a first threshold, determining a representative matrix and a represented matrix from two feature matrices of each of the one or more pairs of correlated matrices based on an amount of information, and determining correspondence between the representative matrix and the represented matrix; a transmission unit for transmitting the representative matrix, the correspondence, and a maximum feature value and a minimum feature value of the represented matrix quantized and encoded to a decoder.

In some embodiments, the determination unit calculates degree of correlation between any two feature matrices based on a distribution of feature values of the various feature matrices, and determines two feature matrices as a pair of correlated matrices if the degree of correlation between the two feature matrices is greater than a first threshold.

In some embodiments, the determination unit calculates a probability of homogeneity of variance between any two feature matrices as the degree of correlation.

In some embodiments, if a represented matrix corresponds to a plurality of representative matrices, the determination unit determines a representative matrix with the largest amount of information among the plurality of representative matrices as the representative matrix that corresponds to the represented matrix.

In some embodiments, the determination unit selects a feature matrix as a current object from candidate feature matrices that are unselected feature matrices, calculates degree of correlation between the current object and respective candidate feature matrices, and selects a next feature matrix as the current object to calculate the degree of correlation until only one candidate feature matrix remains.

In some embodiments, the determination unit performs normalization processing on feature values of each feature matrix, and calculates degree of correlation between any two normalized feature matrices.

In some embodiments, the determination unit calculates an amount of information for each feature matrix, determines whether the amount of information of the feature matrix is less than a second threshold, calculates degree of correlation between any two feature matrices each having an amount of information that is less than the second threshold, and determines one or more pairs of correlated matrices based on a result of comparing the degree of correlation with the first threshold.

In some embodiments, the transmission unit performs a quantization process on the each representative matrix having a corresponding represented matrix, encodes the quantization result, the correspondence, and a maximum feature value and a minimum feature value of each represented matrix, and then transmits them to a decoder.

In some embodiments, the transmission apparatus further comprises: an acquisition unit for performing a decoding process and an inverse quantization process at the decoder to obtain the representative matrix having the correspondence, the correspondence, and the maximum feature value and the minimum feature value of the represented matrix.

In some embodiments, based on a maximum feature value and a minimum feature value of a representative matrix, as well as a maximum feature value and a minimum feature value of a represented matrix that corresponds to the representative matrix, the acquisition unit obtains the represented matrix at the decoder.

In some embodiments, using a channel sequence number of the represented matrix in each pair of correlated matrices as a key value, and a channel sequence number of the represented matrix as a data value, the determination unit stores each pair of correlated matrices as a key-value pair; using the key values, aggregates a plurality of representative matrices corresponding to the same represented matrix to generate a representation relationship dictionary; based on the representation relationship dictionary, determine correspondence between the various representative matrices and the various represented matrices.

According to still other embodiments of the present disclosure, there is provided a transmission system for image features, comprising: an encoder for extracting a feature matrix for a channel of an image to be processed using a machine learning model, determining one or more pairs of correlated matrices based on a result of comparing a degree of correlation between feature matrices with a first threshold, determining a representative matrix and a represented matrix from two feature matrices of each of the one or more pairs of correlated matrices based on an amount of information, determining correspondence between the representative matrix and the represented matrix, and transmitting the representative matrix, the correspondence, and a maximum feature value and a minimum feature value of the represented matrix quantized and encoded to a decoder; a decoder for performing a decoding process and an inverse quantization process to obtain the representative matrix having the correspondence, the correspondence, and the maximum feature value and the minimum feature value of the represented matrix.

According to still other embodiments of the present disclosure, there is provided a transmission apparatus for image features, comprising: a memory; a processor coupled to the memory, the processor configured to, based on instructions stored in the memory, carry out the transmission method for image features according to any one of the above embodiments.

According to still other embodiments of the present disclosure, there is provided a nonvolatile computer readable storage medium having stored thereon a computer program that, when executed by a processor, implements the transmission method for image features according to any one of the above embodiments.

BRIEF DESCRIPTION OF THE DRAWINGS

The accompanying drawings, which are incorporated in and constitute a portion of this specification, illustrate embodiments of the present disclosure and, together with the description, serve to explain the principles of the present disclosure.

The present disclosure will be more clearly understood from the following detailed description with reference to the accompanying drawings, in which.

DETAILED DESCRIPTION

Figure 1:
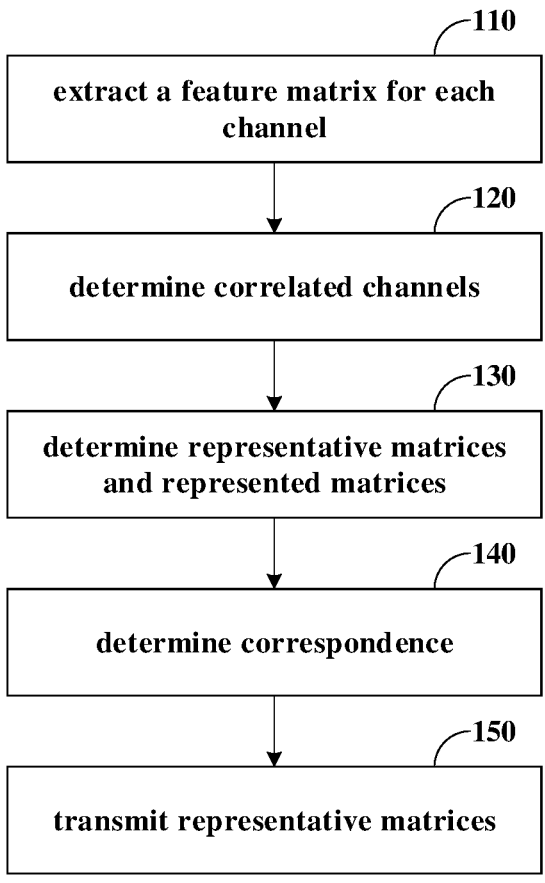
FIG. 1 shows a flowchart of a transmission method for image features according to some embodiments of the present disclosure.

Various exemplary embodiments of the present disclosure will now be described in detail with reference to the accompanying drawings. Notice that, unless otherwise specified, the relative arrangement, numerical expressions and numerical values of the components and steps set forth in these examples do not limit the scope of the invention.

At the same time, it should be understood that, for ease of description, the dimensions of the various parts shown in the drawings are not drawn to actual proportions.

The following description of at least one exemplary embodiment is in fact merely illustrative and is in no way intended as a limitation to the invention, its application or use.

Techniques, methods, and apparatus known to those of ordinary skill in the relevant art may not be discussed in detail, but where appropriate, these techniques, methods, and apparatuses should be considered as part of the specification.

Of all the examples shown and discussed herein, any specific value should be construed as merely illustrative and not as a limitation. Thus, other examples of exemplary embodiments may have different values.

Notice that, similar reference numerals and letters are denoted by the like in the accompanying drawings, and therefore, once an item is defined in a drawing, there is no need for further discussion in the accompanying drawings.

The inventors of the present disclosure have found the following problems existed in the related art: low code compression rate, which makes it difficult to ensure communication quality in the case of an increased amount of communication data.

In view of this, the present disclosure proposes a technical solution for transmitting image features, which can improve the code compression rate and ensure communication quality.

As mentioned above, the increase in data volume directly leads to the low efficiency of existing human vision-based encoding methods, and it is also difficult to meet real-world requirements for latency and scale. Therefore, a feature encoding method based on intelligent machines is needed.

The premise of code compression is redundancy, and the purpose of code compression is to remove redundancy to achieve the compression purpose. Therefore, this disclosure improves the compression rate of feature codes on the basis of redundant features in a neural network.

For example, there are three types of channels in convolutional neural networks: channels (such as RGB (Red, Green, Blue) channels) of an initial input image sample, which depend on the type of the image; channels (out channels) for outputting after completion of a convolution, which depend on the number of convolution kernels. The out channels is then used as the in channels of the convolution kernel for the next convolution, and the in channels of the convolution kernels is the out channels of the previous convolution.

This means that the features of a channel are the result of the superposition of the convolution outputs of all output channels in the previous layer and a convolution kernel with the same number of layers as the output channels. The neural network autonomously learns the weight values of each convolution kernel during the training process, and extracts information of concern based on different convolution kernel weight values. Therefore, an intermediate-layer feature map of a convolutional neural network inevitably contains a large amount of information of non-concern, that is, redundant feature information. Redundancy in feature maps is an important feature of convolutional neural networks.

From a biomimetic perspective, research on the brain has shown that the information encoding of biological neurons is usually scattered and sparse. Usually, only 1% to 4% of neurons in the brain are active at the same time. Linear correction and regularization can be used to adjust the activity (i.e., with positive outputs) of neurons in machine neural networks.

In contrast, the logic function reaches ½ when the input is 0, which is already in a stable semi-saturated state, and does not meet the expectations of actual biology for simulating neural networks. In general, approximately 50% of neurons in a neural network using a rectified linear unit (ReLU, i.e. linear rectification) are active.

Considering the distribution characteristics of channel features in a shallow intermediate layer of a neural network, this disclosure proposes to linearly scale and characterize correlated channels based on channel correlation to reduce the amount of encoded data and improve the compression rate of feature codes.

In some embodiments, correlation between channels can be analyzed through the Leven test for homogeneity of variance. Homogeneity of variance is a prerequisite for t-tests and analysis of variance. F-tests and Bartlett's chi-square tests require strict normality of the data, while Leven's test can be used with arbitrarily distributed data and is a relatively robust method for testing homogeneity of variance. For example, it can be realized by the following embodiments.

FIG. 1 shows a flowchart of a transmission method for image features according to some embodiments of the present disclosure.

As shown in FIG. 1, in step 110, a feature matrix is extracted for each channel of an image to be processed using a machine learning model.

In some embodiments, a RGB (Red Green Blue) image to be processed in size of 4864×3648×3 is processed using Cascade R-CNN (Regions with Convolutional Neural Network) ResNet101 (Residual Network).

For example, the output of the feature layer comprised by a feature outputted by an intermediate layer after the first pooling layer of Cascade R-CNN ResNet101 can be used as the object to be encoded. The intermediate layer may be a 64×200×272 layer, wherein 64 is the number of channels (i.e. the number of feature layers comprised), 200×272 is the size of the feature matrix output by each feature layer. That is to say, the feature information outputted by the intermediate layer contains N feature matrices corresponding to N channels.

In step 120, one or more pairs of correlated matrices are determined based on a result of comparing degree of correlation between any two feature matrices with a first threshold.

In some embodiments, feature values of each feature matrix is normalized; and the degree of correlation between any two normalized feature matrices is calculated. For example, Min-Max normalization is performed on the feature matrix $F_i$ of each channel that requires correlation analysis to obtain the normalized feature matrix $F_i'$ of each channel:

$$F_i'(l, m) = \frac{F_i(l, m) - F_{imin}}{F_{imax} - F_{imin}}$$

$i=0, 1, 2, \ldots, N-1$ (for example, $N=46$), $F_i'(l,m)$ is the element at row i and column m of matrix $F_i'$, $F_i(l,m)$ is the element at row i and column m of $F_i$, $F_{imin}$ is the minimum element in $F_i$, and $F_{imax}$ is the maximum element in $F_i$.

In some embodiments, an amount of information is calculated for each feature matrix; it is determined whether the amount of information of the each feature matrix is less than a second threshold; the degree of correlation between any two feature matrices each having an amount of information that is less than the second threshold are calculated; and one or more pairs of correlated matrices are determined based on a result of comparing the degree of correlation with the first threshold.

For example, the mean of all feature values in a normalized feature matrix is calculated as its information amount, and a degree of correlation is calculated for the feature matrix, in a case where its information amount is less than a second threshold (which can be a positive number less than 1, such as 0.4); in a case where the information amount is greater than or equal to the second threshold (which can be a positive number less than 1, such as 0.4), it indicates that the feature matrix has a large amount of information, which will be transmitted to the decoder after quantization and encoding without compression.

In some embodiments, the degree of correlation between any two feature matrices are calculated based on a distribution of feature values of the each feature matrices. For example, a probability of homogeneity of variance between any two feature matrices is calculated as the degree of correlation.

In some embodiments, a feature matrix is selected as a current object from candidate feature matrices that are unselected feature matrices; a degree of correlation between the current object and each of the candidate feature matrices is calculated; a next feature matrix is selected as a current object to calculate a degree of correlation until only one candidate feature matrix remains.

For example, i, which has an initial value of 0, is used to set a Current Sequence Number. A probability $P_{ik}$ of homogeneity of variance between the normalized feature matrix $F_i'$ and the other feature matrices $F_k'$ (k has not been set as the Current Sequence Number), $k=i+1, i+2, \ldots, N-1$. $P_{ik}$ can be obtained through Levene's test for homogeneity of variance.

In some embodiments, two feature matrices are determined as a pair of correlated matrices in a case where the degree of correlation between the two feature matrices is greater than a first threshold.

For example, $F_k'$, the $P_{ik}$ of which is greater than the first threshold (a positive number less than 1, such as 0.05), are bound with $F_i'$ as one pair of correlated matrices, and the channel sequence numbers bound of the pairs of correlated matrices are recorded in the form of: $(i, k_1), (i, k_2), \ldots, (i, k_m)$. m is the number of channels, each of which has a channel sequence number greater than i and a $P_{ik}$ value greater than the first threshold with respect to channel i. The current sequence number i is increased by 1 to repeat the above steps until i is greater than $N-1$.

For example, the following pairs of matrix shown in Table 1 can be obtained:

TABLE 1

| Channel Sequence Number | Channel Sequence Number | probability of homogeneity of variance |
|---|---|---|
| 0 | 33 | 0.42400 |
| 1 | 24 | 0.43919 |
| 1 | 59 | 0.83400 |
| 2 | 44 | 0.30327 |
| 6 | 40 | 0.21710 |
| 10 | 57 | 0.38697 |
| 10 | 58 | 0.66204 |
| 16 | 30 | 0.44884 |
| 16 | 52 | 0.56812 |
| 24 | 59 | 0.61666 |
| 26 | 28 | 0.19038 |
| 26 | 61 | 0.12886 |
| 30 | 52 | 0.18694 |
| 44 | 45 | 0.26406 |
| 57 | 58 | 0.188391 |

In step 130, a representative matrix and a represented matrix from two feature matrices of each of the one or more pairs of correlated matrices are determined based on an amount of information.

In some embodiments, the channel sequence number of a channel with a larger sum of feature values before normalization in a pair of matrices is used as the representative channel (representative matrix), and the channel sequence number of a channel with a smaller sum of feature values before normalization is used as the corresponding represented channel (represented matrix).

For example, using the channel sequence number of the represented matrix in the pair of matrices as a key value, and the channel sequence number of the represented matrix as a data value, the pair of matrices is stored as a key-value pair; using the key values, a plurality of representative matrices corresponding to the same represented matrix are aggregated to generate a representation relationship dictionary shown in Table 2:

TABLE 2

| No. of Pair of Matrices | No. of Represented Channel | No. of Representative Channel |
|---|---|---|
| 1 | 33 | 0 |
| 2 | 2 | 44 |
| 3 | 6 | 40 |
| 4 | 10 | 57 |
| 5 | 45 | 44 |
| 6 | 16 | 30, 52 |
| 7 | 24 | 1, 59 |
| 8 | 58 | 10, 57 |
| 9 | 59 | 1 |
| 10 | 28 | 26 |
| 11 | 61 | 26 |
| 12 | 30 | 52 |

In step 140, correspondence between the representative matrix and the represented matrix is determined.

In some embodiments, a representative matrix with largest amount of information among a plurality of representative matrices is determined as a representative matrix corresponding to a represented matrix, in a case where the represented matrix corresponds to the plurality of representative matrix.

For example, each of pairs of matrices 6, 7, 8 in Table 2 comprises a represented matrix corresponding to a plurality of representative matrices. For each of the plurality of representative matrices $F_{kn}$ of the representative channels $C_{kn}$ corresponding to the same represented matrix $C_k$, a sum of its feature values before normalization is calculated, and a feature matrix having the maximum sum value is used as the representative matrix $C_V$ corresponding to $C_k$:

$$V \in \max \left\{ \sum_0^{H \times W} F_{kn} \right\}$$

$$\{C_k : C_V\}$$

The correspondence can be recorded in a mapping table:

TABLE 3

| Channel Sequence Number | Represented Channel No. | Representative Channel No. |
|---|---|---|
| 1 | 33 | 0 |
| 2 | 2 | 44 |
| 3 | 6 | 40 |
| 4 | 10 | 57 |
| 5 | 45 | 44 |
| 6 | 16 | 52 |
| 7 | 24 | 1 |
| 8 | 58 | 57 |
| 9 | 59 | 1 |
| 10 | 28 | 26 |
| 11 | 61 | 26 |
| 12 | 30 | 52 |

In step 150, the representative matrix, the correspondence, and a maximum feature value and a minimum feature value of the represented matrix quantized and encoded are transmitted to a decoder.

In some embodiments, a quantization process is performed on the representative matrix having the correspondence; and a result of the quantization, the correspondence, and the maximum feature value and the minimum feature value of the represented matrix encoded are transmitted to the decoder.

For example, representative matrices Fj (j=0, 1, 26, 40, 44, 52, 57) corresponding to 7 representative channels in Table 3 are quantized to Fj'. The quantization may be uniform quantization, etc. Linear scaling information and each Fj' can be encoded to form a binary stream. The linear scaling information comprises a mapping table, a maximum value and a minimum value of each represented matrix, etc.

In the above embodiment, based on the correlation between the feature matrices of different channels in the machine learning model, redundant information in the information to be transmitted is eliminated, thereby improving the code compression rate and ensuring communication quality.

Figure 2:
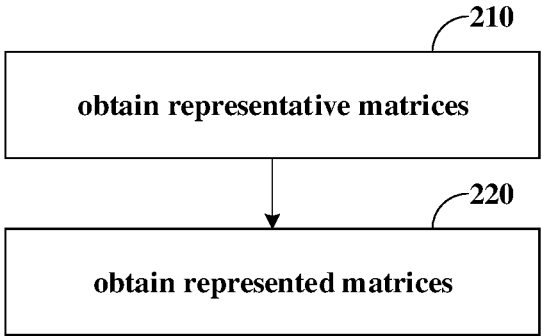
FIG. 2 shows a flowchart of a transmission method for image features according to other embodiments of the present disclosure.

In some embodiments, the technical solution of the present disclosure may be implemented by a decoder according to the embodiments shown in FIG. 2.

FIG. 2 shows a flowchart of a transmission method for image features according to other embodiments of the present disclosure.

As shown in FIG. 2, in step 210, a decoding process and an inverse quantization process are performed at the decoder to obtain the representative matrix having the correspondence, the correspondence, and the maximum feature value and the minimum feature value of the represented matrix.

In step 220, the represented matrix at the decoder is obtained, based on a maximum feature value and a minimum feature value of the representative matrix and the maximum feature value and the minimum feature value of the represented matrix corresponding to the representative matrix.

In some embodiments, the binary stream is decoded to obtain the linear scaling information and each Fj'; Fj' is inverse quantized to obtain the feature matrix Fj of the representative channel; the feature matrix $F_V$ of the represented channel corresponding to the feature matrix Fj of the representative channel is represented linearly with the feature matrix Fj:

$$\frac{F_j - \min(F_j)}{\max(F_j) - \min(F_j)} = \frac{F_V - \min(F_V)}{\max(F_V) - \min(F_V)}$$

max( ) and min( ) are functions for extracting the maximum and minimum values of elements in a matrix. By solving the above expression, the represented matrix $F_V$ is obtained.

In the above embodiment, considering the distribution characteristics of the channel features in the intermediate layer of the convolutional neural network, channel correlation is analyzed using the Leneve's test for homogeneity of variance, and the correlated channel is represented by linear scaling. Thus, the amount of encoded data can be reduced and the compression rate of feature codes can be improved.

Figure 3:
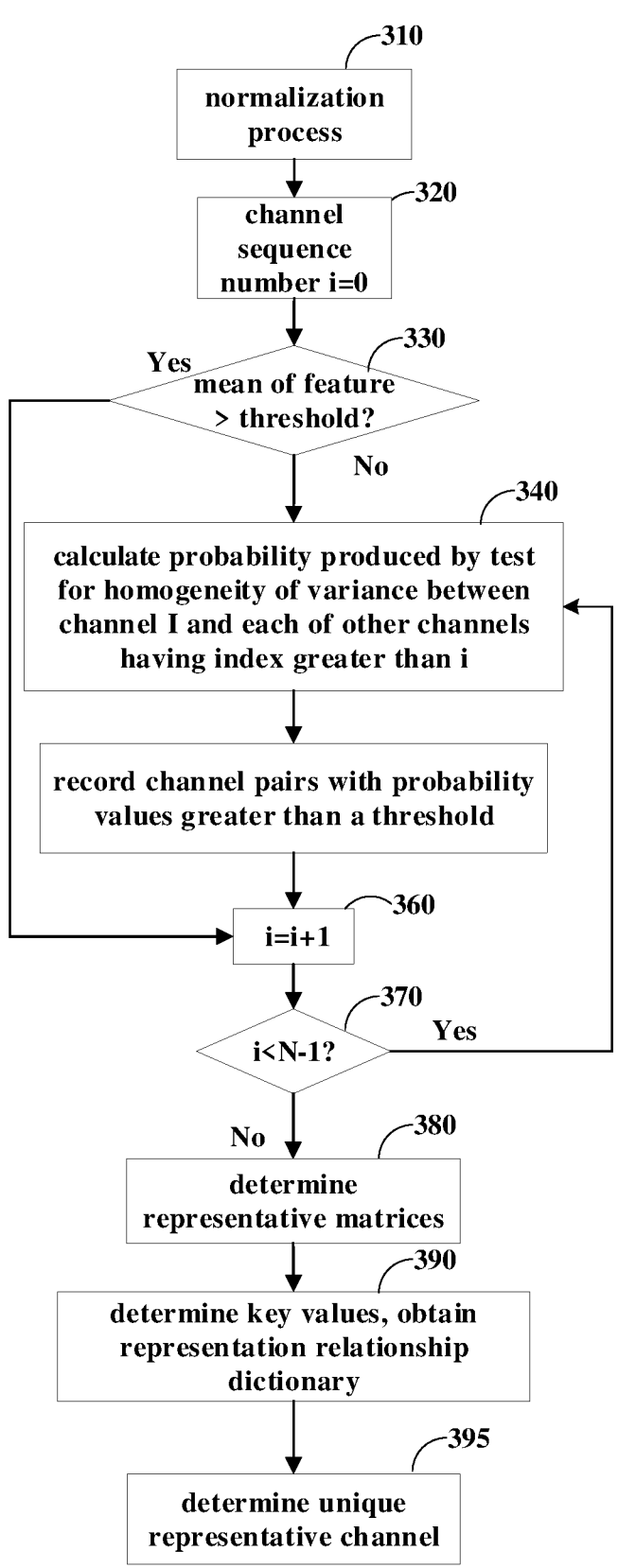
FIG. 3 shows a flowchart of a transmission method for image features according to still other embodiments of the present disclosure.

FIG. 3 shows a flowchart of a transmission method for image features according to still other embodiments of the present disclosure.

As shown in FIG. 3, Min-Max normalization is performed on the feature matrix $F_i$ of each channel that requires correlation analysis in step 310 to obtain the normalized feature matrix $F_i'$ of each channel:

$$F_i'(l, m) = \frac{F_i(l, m) - F_{imin}}{F_{imax} - F_{imin}}$$

i=0, 1, 2, . . . , N−1 (for example, N=46), $F_i'(l,m)$ is the element at row i and column m of matrix $F_i'$, $F_i(l,m)$ is the element at row i and column m of $F_i$, $F_{imin}$ is the minimum element in $F_i$, and $F_{imax}$ is the maximum element in $F_i$.

In step 320, a channel index i, which has an initial value of 0, is used as a Current Sequence Number.

In step 330, it is determined whether the mean of the feature values in the feature matrix of channel i is greater than a threshold. If not, the method proceeds to step 340; otherwise, the method proceeds to step 360.

In step 340, a probability $P_{ik}$ of homogeneity of variance between the normalized feature matrix $F_i'$ and the other feature matrices $F_k'$ (k has not been set as the Current Sequence Number), k=i+1, i+2, . . . , N−1.

In step 350, channel pairs with $P_{ik}$ values produced by Leneve's test for homogeneity of variance with respect to channel i that are greater than the threshold are recorded: (i, $k_1$), (i, $k_2$), . . . , (i,$k_m$). m is the number of channels, each of which has a channel sequence number greater than i and a $P_{ik}$ greater than the first threshold with respect to channel i.

In step 360, the channel index, which is the Current Sequence Number, is increased by 1.

In step 370, it is determined whether i is less than N−1. If so, the method returns to step 330 to repeat steps 330 to 360 until i is greater than N−1; otherwise, the method proceeds to step 380.

In step 380, the channel sequence number of a channel with a larger sum of feature values before normalization in a pair of matrices is used as the representative channel (representative matrix), and the channel sequence number of a channel with a smaller sum of feature values before normalization is used as the corresponding represented channel (represented matrix).

In step 390, using the channel sequence number of the represented matrix $C_k$ in the pair of matrices as a key value, and a channel sequence number of the representative matrix $C_{kn}$, as a data value, the pair of matrices is stored as a key-value pair; using the key values, a plurality of representative matrices corresponding to the same represented matrix are aggregated to generate a representation relationship dictionary:

$$\{C_k: \cup C_{kn}\}$$

n is the number of representative channels corresponding to channel k.

In step 395, for each of the representative matrices $F_{kn}$ of the plurality of representative matrices $C_{kn}$ corresponding to the same represented matrix $C_k$, a sum of $F_{kn}$'s feature values before normalization is calculated, a feature channel having a maximum sum value is used as a only representative channel $C_V$ corresponding to $C_k$:

$$V \in \max\left\{\sum_0^{H*W} F_{kn}\right\}$$

$$\{C_k:C_V\}$$

The correspondence can be recorded in a mapping table.

Figure 4:
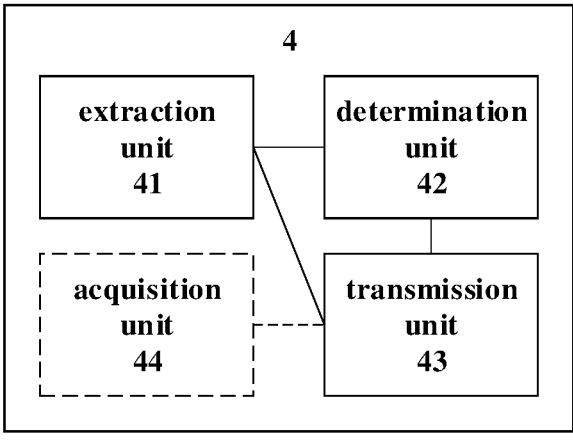
FIG. 4 shows a block diagram of a transmission apparatus for image features according to some embodiments of the present disclosure.

FIG. 4 shows a block diagram of a transmission apparatus for image features according to some embodiments of the present disclosure.

As shown in FIG. 4, the transmission apparatus for image features 4 comprises an extraction unit 41, a determination unit 42, and a transmission unit 43.

The extraction unit 41 is used for extracting a feature matrix for a channel of an image to be processed using a machine learning model.

The determination unit 42 is used for determining one or more pairs of correlated matrices based on a result of comparing a degree of correlation between feature matrices with a first threshold; determining a representative matrix and a represented matrix from two feature matrices of each of the one or more pairs of correlated matrices based on an amount of information; and determining correspondence between the representative matrix and the represented matrix.

In some embodiments, the determination unit 42 is used for calculating the degree of correlation between the feature matrices based on a distribution of feature values of the feature matrices; determining two feature matrices as a pair of correlated matrices in a case where a degree of correlation between the two feature matrices is greater than a first threshold.

In some embodiments, the determination unit 42 calculates a probability of homogeneity of variance between any two feature matrices as the degree of correlation.

In some embodiments, if a represented matrix corresponds to a plurality of representative matrices, the determination unit 42 determines a representative matrix with the largest amount of information among the plurality of representative matrices as the representative matrix that corresponds to the represented matrix.

In some embodiments, the determination unit 42 selects a feature matrix as a current object from candidate feature matrices that are unselected feature matrices. The determination unit 42 calculates degree of correlation between the current object and respective candidate feature matrices, and selects a next feature matrix as the current object to calculate the degree of correlation until only one candidate feature matrix remains.

In some embodiments, the determination unit 42 performs normalization processing on feature values of each feature matrix, and calculates degree of correlation between any two normalized feature matrices.

In some embodiments, the determination unit 42 calculates an amount of information for each feature matrix, and determines whether the amount of information of the feature matrix is less than a second threshold; calculates degree of correlation between any two feature matrices each having an amount of information that is less than the second threshold; determines one or more pairs of correlated matrices based on a result of comparing the degree of correlation with the first threshold.

The transmission unit 43 is used for transmitting the representative matrix, the correspondence, and a maximum feature value and a minimum feature value of the represented matrix quantized and encoded to a decoder.

In some embodiments, the transmission unit 43 performs a quantization process on the each representative matrix having a corresponding represented matrix, encodes the quantization result, the correspondence, and a maximum feature value and a minimum feature value of each represented matrix, and then transmits them to a decoder.

In some embodiments, the transmission apparatus 4 further comprises: an acquisition unit 44 for performing a decoding process and an inverse quantization process at the decoder to obtain the representative matrix having the correspondence, the correspondence, and the maximum feature value and the minimum feature value of the represented matrix.

In some embodiments, based on a maximum feature value and a minimum feature value of a representative matrix, as well as a maximum feature value and a minimum feature value of a represented matrix that corresponds to the representative matrix, the acquisition unit 44 obtains the represented matrix at the decoder.

In some embodiments, using a channel sequence number of the represented matrix in each pair of correlated matrices as a key value, and a channel sequence number of the represented matrix as a data value, the determination unit 42 stores each pair of correlated matrices as a key-value pair; using the key values, aggregates a plurality of representative matrices corresponding to the same represented matrix to generate a representation relationship dictionary; based on the representation relationship dictionary, determines correspondence between the various representative matrices and the various represented matrices.

Figure 5:
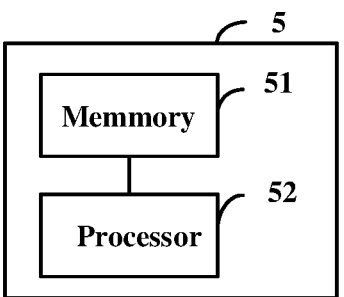
FIG. 5 shows a block diagram of a transmission apparatus for image features according to other embodiments of the present disclosure.

FIG. 5 shows a block diagram of a transmission apparatus for image features according to other embodiments of the present disclosure.

As shown in FIG. 5, the transmission apparatus for image features 5 of this embodiment comprises: a memory 51 and a processor 52 coupled to the memory 51, the processor 52 configured to, based on instructions stored in the memory 51, carry out the transmission method for image features according to any one of the embodiments of the present disclosure.

Wherein, the memory 51 may comprise, for example, system memory, a fixed non-transitory storage medium, or the like. The system memory stores, for example, an operating system, applications, a boot loader, a database, and other programs.

Figure 6:
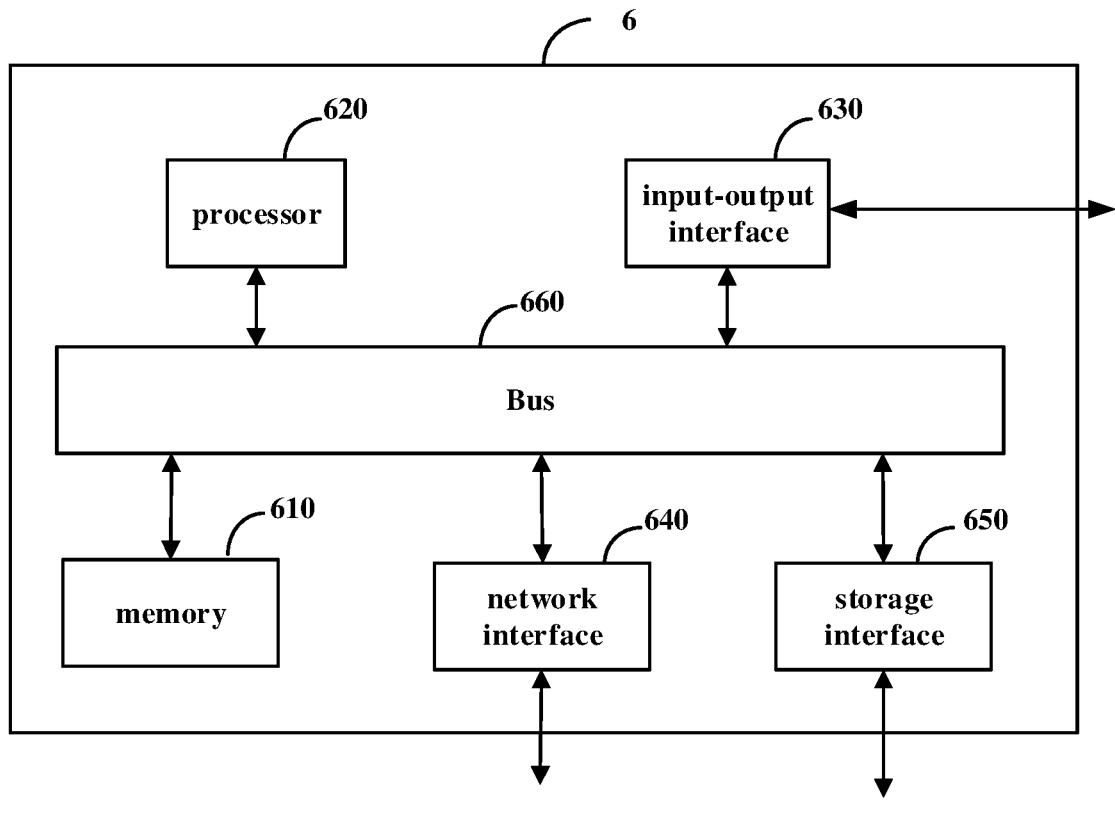
FIG. 6 shows a block diagram of a transmission apparatus for image features according to still other embodiments of the present disclosure.

FIG. 6 shows a block diagram of a transmission apparatus for image features according to still other embodiments of the present disclosure.

As shown in FIG. 6, the transmission apparatus for image features 6 of this embodiment comprises: a memory 610 and a processor 620 coupled to the memory 610, the processor 620 configured to, based on instructions stored in the memory 610, carry out the transmission method for image features according to any one of the embodiments of the present disclosure.

The memory 610 may comprise, for example, system memory, a fixed non-transitory storage medium, or the like. The system memory stores, for example, an operating system, application programs, a boot loader, and other programs.

The transmission apparatus for image features 6 may further comprise an input-output interface 630, a network interface 640, a storage interface 650, and the like. These interfaces 630, 640, 650, the memory 610 and the processor 620 may be connected through a bus 660, for example. Wherein, the input-output interface 630 provides a connection interface for input-output devices such as a display, a mouse, a keyboard, a touch screen, a microphone, a loudspeaker, etc. The network interface 640 provides a connection interface for various networked devices. The storage interface 650 provides a connection interface for external storage devices such as an SD card and a USB flash disk.

Figure 7:
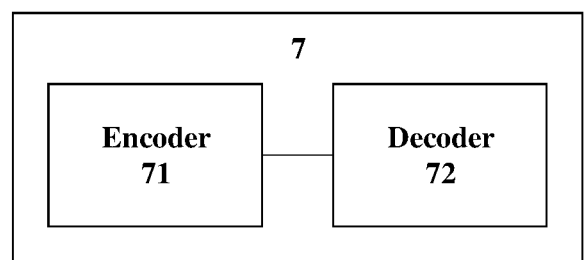
FIG. 7 shows a block diagram of a transmission system for image features according to some embodiments of the present disclosure.

FIG. 7 shows a block diagram of a transmission system for image features according to some embodiments of the present disclosure.

As shown in FIG. 7, the transmission system for image features 7 comprises an encoder 71 and a decoder 72.

The encoder 71 extracts a feature matrix for a channel of an image to be processed using a machine learning model, determine one or more pairs of correlated matrices based on a result of comparing a degree of correlation between feature matrices with a first threshold, determine a representative matrix and a represented matrix from two feature matrices of each of the one or more pairs of correlated matrices based on an amount of information, determine correspondence between the representative matrix and the represented matrix, and transmit the representative matrix, the correspondence, and a maximum feature value and a minimum feature value of the represented matrix quantized and encoded to a decoder.

The decoder 72 performs a decoding process and an inverse quantization process at the decoder to obtain the representative matrix having the correspondence, the correspondence, and the maximum feature value and the minimum feature value of the represented matrix.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical memory, etc.) having computer-usable program code embodied therein.

Heretofore, a transmission method for image features, a transmission apparatus for image features, a transmission system for image features, and a non-transitory computer readable storage medium according to the present disclosure have been described in detail. In order to avoid obscuring the concepts of the present disclosure, some details known in the art are not described. Based on the above description, those skilled in the art can understand how to implement the technical solutions disclosed herein.

The method and system of the present disclosure may be implemented in many ways. For example, the method and system of the present disclosure may be implemented by software, hardware, firmware, or any combination of software, hardware, and firmware. The above sequence of steps of the method is merely for the purpose of illustration, and the steps of the method of the present disclosure are not limited to the above-described specific order unless otherwise specified. In addition, in some embodiments, the present disclosure may also be implemented as programs recorded in a recording medium, which comprise machine-readable instructions for implementing the method according to the present disclosure. Thus, the present disclosure also covers a recording medium storing programs for executing the method according to the present disclosure.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified without departing from the scope and spirit of the present disclosure. The scope of the disclosure is defined by the following claims.

What is claimed is:

1. A transmission method for image features, comprising:
extracting a feature matrix for a channel of an image to be processed using a machine learning model;
determining one or more pairs of correlated matrices based on a result of comparing a degree of correlation between feature matrices with a first threshold;
determining a representative matrix and a represented matrix from two feature matrices of each of the one or more pairs of correlated matrices based on an amount of information;
determining correspondence between the representative matrix and the represented matrix; and
transmitting the representative matrix, the correspondence, and a maximum feature value and a minimum feature value of the represented matrix quantized and encoded to a decoder.

2. The transmission method according to claim 1, wherein the determining the one or more pairs of correlated matrices based on the result of comparing the degree of correlation between the feature matrices with the first threshold comprises:
calculating the degree of correlation between the feature matrices based on a distribution of feature values of the feature matrices; and
determining two feature matrices as a pair of correlated matrices in a case where a degree of correlation between the two feature matrices is greater than a first threshold.

3. The transmission method according to claim 2, wherein the calculating the degree of correlation between the feature matrices based on the distribution of feature values of the feature matrices comprises:
calculating a probability of homogeneity of variance between the feature matrices as the degree of correlation.

4. The transmission method according to claim 1, wherein the determining correspondence between the representative matrix and the represented matrix comprises:

determining a representative matrix with largest amount of information among a plurality of representative matrices as a representative matrix corresponding to a represented matrix, in a case where the represented matrix corresponds to the plurality of representative matrices.

5. The transmission method according to claim 1, wherein the determining one or more pairs of correlated matrices based on the result of comparing the degree of correlation between feature matrices with the first threshold comprises:

selecting a feature matrix as a current object from candidate feature matrices that are unselected feature matrices;

calculating a degree of correlation between the current object and each of the candidate feature matrices; and selecting a next feature matrix as a current object to calculate a degree of correlation until only one candidate feature matrix remains.

6. The transmission method according to claim 1, wherein the determining one or more pairs of correlated matrices based on the result of comparing the degree of correlation between the feature matrices with the first threshold comprises:

normalizing feature values of each of the feature matrices; and calculating the degree of correlation between normalized feature matrices.

7. The transmission method according to claim 1, further comprising:

calculating an amount of information for the feature matrix; and determining whether the amount of information of the feature matrix is less than a second threshold;

wherein determining one or more pairs of correlated matrices based on the result of comparing the degree of correlation between feature matrices with the first threshold comprises:

calculating the degree of correlation between feature matrices having amounts of information that are less than the second threshold; and determining the one or more pairs of correlated matrices based on a result of comparing the degree of correlation with the first threshold.

8. The transmission method according to claim 1, wherein the transmitting the representative matrix, the correspondence, and the maximum feature value and the minimum feature value of the represented matrix quantized and encoded to the decoder comprises:

performing a quantization process on the representative matrix having the correspondence; and transmitting a result of the quantization, the correspondence, and the maximum feature value and the minimum feature value of the represented matrix encoded to the decoder.

9. The transmission method according to claim 1, further comprising:

performing a decoding process and an inverse quantization process at the decoder to obtain the representative matrix having the correspondence, the correspondence, and the maximum feature value and the minimum feature value of the represented matrix.

10. The transmission method according to claim 9, further comprising:

obtaining the represented matrix at the decoder, based on a maximum feature value and a minimum feature value of the representative matrix and the maximum feature value and the minimum feature value of the represented matrix corresponding to the representative matrix.

11. The transmission method according to claim 1, wherein determining the correspondence between the representative matrix and the represented matrix comprises:

storing each of the one or more pairs of correlated matrices as a key-value pair, using a channel sequence number of a represented matrix in the each of the pairs of correlated matrices as a key value, and a channel sequence number of the represented matrix in the each of the pairs of correlated matrices as a data value;

aggregating a plurality of representative matrices corresponding to a same represented matrix to generate a representation relationship dictionary, using the key value; and determining the correspondence between the representative matrix and the represented matrix, based on the representation relationship dictionary.

12. A non-transitory computer-readable storage medium stored thereon a computer program that, when executed by a processor, implements the transmission method for image features according to claim 1.

13. A transmission apparatus for image features, comprising:

a memory; and a processor coupled to the memory, the processor configured to, based on instructions stored in the memory, implement a transmission method for image features, comprising:

extracting a feature matrix for a channel of an image to be processed using a machine learning model;

determining one or more pairs of correlated matrices based on a result of comparing a degree of correlation between feature matrices with a first threshold;

determining a representative matrix and a represented matrix from two feature matrices of each of the one or more pairs of correlated matrices based on an amount of information;

determining correspondence between the representative matrix and the represented matrix; and transmitting the representative matrix, the correspondence, and a maximum feature value and a minimum feature value of the represented matrix quantized and encoded to a decoder.

14. The transmission apparatus according to claim 13, wherein the processor is configured to perform steps of:

calculating the degree of correlation between the feature matrices based on a distribution of feature values of the feature matrices; and determining two feature matrices as a pair of correlated matrices in a case where a degree of correlation between the two feature matrices is greater than a first threshold.

15. The transmission apparatus according to claim 14, wherein the processor is configured to perform a step of:

calculating a probability of homogeneity of variance between the feature matrices as the degree of correlation.

16. The transmission apparatus according to claim 13, wherein the processor is configured to perform a step of:

determining a representative matrix with largest amount of information among a plurality of representative matrices as a representative matrix corresponding to a represented matrix, in a case where the represented matrix corresponds to the plurality of representative matrices.

17. The transmission apparatus according to claim 13, wherein the processor is configured to perform steps of:

selecting a feature matrix as a current object from candidate feature matrices that are unselected feature matrices;

calculating a degree of correlation between the current object and each of the candidate feature matrices; and selecting a next feature matrix as a current object to calculate a degree of correlation until only one candidate feature matrix remains.

18. The transmission apparatus according to claim 13, wherein the processor is configured to perform steps of:

normalizing feature values of each of the feature matrices; and calculating the degree of correlation between normalized feature matrices.

19. The transmission apparatus according to claim 13, wherein the processor is configured to perform steps of:

calculating an amount of information for the feature matrix; and determining whether the amount of information of the feature matrix is less than a second threshold;

wherein determining one or more pairs of correlated matrices based on the result of comparing the degree of correlation between feature matrices with the first threshold comprises:

calculating the degree of correlation between feature matrices having amounts of information that are less than the second threshold; and determining the one or more pairs of correlated matrices based on a result of comparing the degree of correlation with the first threshold.

\* \* \* \* \*